MECHANICALLY DAMPED TENSION SYSTEM FOR TAPE RECORDER

Filed Feb. 8, 1961

INVENTOR.
WALTER E. FOSTER.
BY Alden D. Redfield
Charles M. Hogan
ATTORNEYS.

3,022,960

MECHANICALLY DAMPED TENSION SYSTEM FOR TAPE RECORDER

Walter E. Foster, Bellevue, Ky., assignor to Avco Corporation, Cincinnati, Ohio, a corporation of Delaware
Filed Feb. 8, 1961, Ser. No. 87,942
6 Claims. (Cl. 242—75.3)

The present invention relates to tape tension and take-up devices for magnetic tape recorders.

Conventional magnetic recorders are equipped with take-up arms suitably mounted in bearings and angularly rotatable so as to supply or take up tape as required. Each take-up arm is generally provided with a dash pot or equivalent damping means in order to avoid undesired "bounce" or oscillation of the arm. Such uncontrolled movements of the arm change the desired relationship of the tape to the magnetic head and introduce signal attenuation, which impairs the fidelity of the recorder. However, dash pots suffer from limitations and disadvantages such as lack of adequate response and valve-orifice clogging.

It is therefore a primary object of the present invention to provide a tension and take-up device for magnetic recorders which dispenses with dash pots and the like and their attendant disadvantages.

For a better understanding of the present invention together with other and further objects, advantages, and capabilities thereof, reference is made to the following description of the accompanying drawings, in which.

Figure 1:
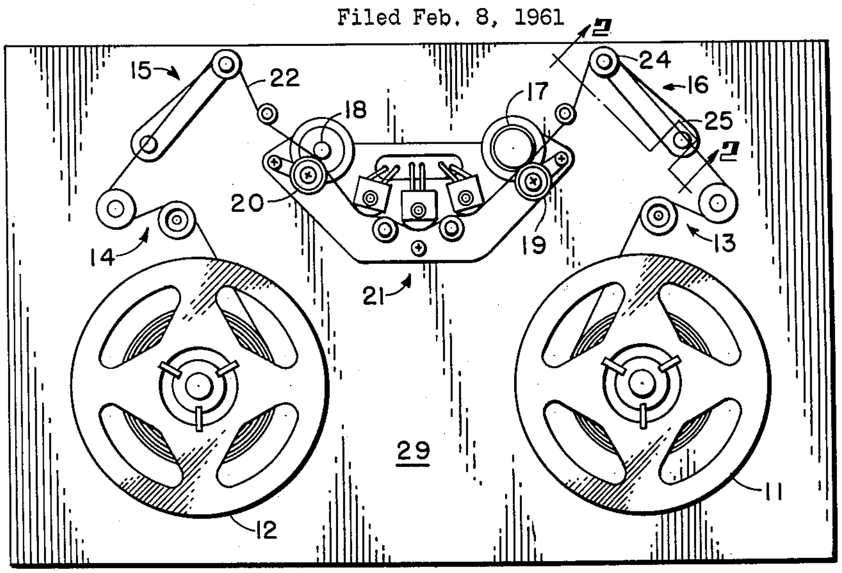
FIG. 1 is a top plan view of a magnetic recorder including a pair of tape tension and take-up devices in accordance with the invention.

The invention is of general utility in magnetic recorders, of which an illustration is given in FIG. 1. The FIG. 1 recorder comprises a pair of reels 11 and 12, idler roller groups 13 and 14, tension and take-up devices 15 and 16, a high-speed capstan 17, a low-speed capstan 18, tape-clutching idlers 19 and 20, and recording and play-back and erasing heads collectively designated by the reference numeral 21. Movement of the magnetic tape 22 under the heads is initiated by positioning a rubber idler roller, for example 19, into contact with a constant-speed rotating capstan such as 17.

High-speed capstan 17 rotates counter-clockwise to draw tape from supply reel 12 to take-up reel 11. Slow-speed capstan 18 rotates clockwise to draw tape from reel 11, then functioning as a supply reel, to reel 12.

Assuming that a counter-clockwise drive of high-speed capstan 17 is being initiated by a capstan drive motor (not shown), a free length of tape tends to be generated between the capstan and the take-up reel 11. It is necessary that proper tension be maintained on tape 22 during this phase of operation in order to insure that the tape remains in close contact with the heads. Tension and take-up device 16 performs this function.

Upon the initiation of counter-clockwise rotation of high-speed capstan 17, it is desirable to bring the magnetic tape 22 up to constant linear speed in as brief a time as possible, which means that a length of tape should be immediately available between the supply reel 12 and the capstan 17. The function of rendering this supply available is performed by tension and take-up device 15.

When capstan 18 is operating, device 15 takes up the slack, and device 16 furnishes the desired quick supply of tape.

This brief description of the setting and environment of devices 15 and 16 is given in order that the purpose and objectives of the invention may be better understood.

Figure 2:
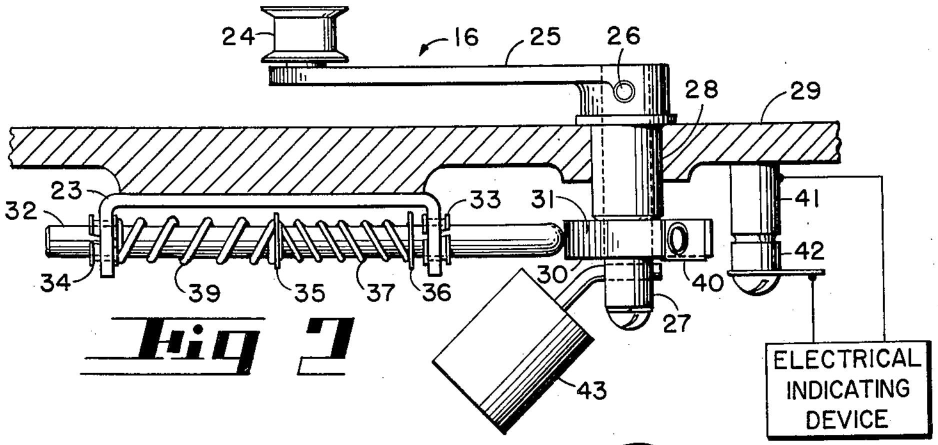
FIG. 2 is an elevational sectional view of one of said devices, as taken on line 2—2 of FIG. 1, looking in the direction of the arrows, showing the base member in section.

Referring first to FIG. 1, a tape tension and take-up device in accordance with the invention is indicated by the reference numeral 16. Guide roller 24 positions and guides the magnetic tape 22 between a point of supply or origin and a point of delivery or destination, the crank arm 25 swinging counter-clockwise to shorten the path of the tape. Referring now to FIG. 2, roller 24 is rotatably mounted on the end of crank arm 25, which is fixed, by set screw 26, to a shaft 27. The shaft is mounted in a bearing 28 disposed in a suitable aperture drilled in a base member 29. Also secured to the shaft 27, and beneath bearing 28, is a cam 30, formed with a curved surface 31 which ascends—i.e., pushes cam follower or plunger 32 to the left (FIG. 2)—as arm 25 moves counter-clockwise (viewed from the top). Spring-biased against the cam surface 31 is a cam follower in the form of a plunger 32, positioned for linear displacement in a pair of concentric spaced bushings 33, 34. The bushings are disposed within suitable openings formed in the depending extremities of a bracket 23, which is rigidly secured to base member 29. Slidably secured to follower 32 is a spring-spacing washer 35. A stop member 36 is rigidly secured to plunger 32 adjacent bushing 33. Between washer 35 and stop 36 is secured a relatively light or weak metallic compression spring 37, while between washer 35 and bushing 34 is positioned a relatively heavy or strong metallic compression spring 39. When the cam follower is displaced by rising cam surface 31, spring 37 is primarily compressed and spring 39 is secondarily compressed. That is, spring 37 is compressed at a greater rate.

Figure 3:
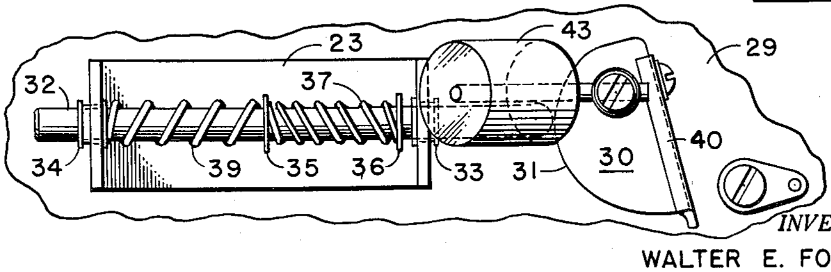
FIG. 3 is a bottom view of the FIG. 2 device.

It will be observed that a break in the tape at or near roller 24 will be accompanied by a clockwise swing of arm 25 (and counter-clockwise rotation of cam 30, as viewed in FIG. 3). This movement is exploited by the provision of a suitably insulated metallic contact 40, carried by cam 30. Spaced electrical contacts 41 and 42 are mounted in depending fashion from base member 29, and so positioned relative to cam 30 that contact 40 closes a circuit between contacts 41 and 42 at the limit of the angular movement of crank arm 25 which is occasioned by a breaking of the tape. The closure of a circuit may be employed electrically to indicate tape breakdown and to stop the capstan and reel drives. A counterweight 43 is suitably attached to shaft 27 to assure that arm 25 swings in the desired direction upon breaking of the magnetic tape.

Springs 37 and 39 are compressed with linear movement of the plunger 32 to provide a tandem resistance to rotation of cam 30. The resistance is light initially as the first spring 37 begins to be compressed, and gradually increases when the heavier spring 39 begins to be compressed. Then the resistance is very strong. The positional relationships of the take-up-arm shaft 27 and the cam follower 32 are so disposed as to preload the take-up arm 25 by means of the lighter spring 37.

As tape is demanded from reel 11 by the clockwise driving of capstan 18, for example, the take-up arm 25 of device 16 rotates (counter-clockwise, FIG. 1) from its normal position and effects a quick tape supply in advance of the supply from storage reel 11. The corresponding arm of device 15 then moves counter-clockwise to take up slack.

At the initiation of the rewind function of reel 11, where tape movement is accomplished by directly driving the tape storage reel 11 counter-clockwise, arm 25 moves counter-clockwise (FIG. 1) to rotate the cam in a direction (clockwise, FIG. 3) in which the cam encounters a progressively increasing resistance to such rotation, the arm movement providing an advance supply of tape before supply reel 12 starts. That action reduces the danger of tape stretching or breakage due to the sudden acceleration of the reels.

The operating conditions at the start of capstan action or rewind have been discussed. After capstan action is under way, and as capstan 18 continues to feed tape to the left, the arm of device 15 moves counter-clockwise (FIG. 1) and the arm of device 16 moves clockwise to take up any slack which may develop and to maintain suitable tension on the tape to assure its remaining in the desired close proximity to the recording head.

It will be understood that the construction and operation of the tension and take-up device 15 are generally similar to those of device 16, except that, while in device 16 cam surface 31 depresses plunger 32 as arm 25 moves counter-clockwise, in device 15 the corresponding cam is so arranged that depression of a cam follower occurs as the arm moves clockwise. As tape is demanded from reel 12 by the counter-clockwise driving of capstan 17, the take-up arm of device 15 rotates clockwise from its static position and effects a quick tape supply in advance of the supply from storage reel 12.

At the initiation of the rewind function of reel 12, where tape movement is accomplished by directly driving the tape storage reel 12 clockwise, the arm of device 15 moves clockwise to provide the advance supply of tape before supply reel 11 starts.

After capstan action is under way, and as capstan 17 continues to feed tape to the right, the arm of device 16 moves clockwise and the arm of device 15 moves counter-clockwise to take up any slack which may develop and to maintain suitable tension on the tape.

While there has been shown and described what is at present considered to be the preferred embodiment of the invention, it will be understood by those skilled in the art that various changes and modifications may be made therein without departing from the true scope of the invention as defined by the appended claims.

I claim:

1. A tape tension and take-up device for a tape recorder, comprising, in combination, a guide roller for positioning a magnetic tape in tension between points of origin and destination, a base having an aperture formed therein, crank means having a shaft rotatably projecting through said aperture and an arm positioned to swing in a plane parallel to the base member, said guide roller being rotatably mounted on the free end of said arm, and means for controlling displacement of said arm so that the guide roller follows the tape, comprising: a cam rigidly secured to said shaft, a spring-biased member mounted to exert pressure against said cam, and a series pair of springs mounted on said base for providing the bias, one of said springs being relatively strong and the other being relatively weak, said springs and biased member and cam being so arranged that swinging movement of the arm to shorten the path of the tape between points of origin and destination rotates the cam to displace the biased member, first in primary opposition to the bias of the weaker spring and then in secondary opposition to the bias of the stronger spring.

2. A tape tension and take-up device for a tape recorder, comprising, in combination, means for guiding a magnetic tape in tension between points of origin and destination, including a crank having a shaft extending parallel to the tape width and an arm mounted to swing in a plane transverse to the tape, and means for controlling the angular displacement of said arm as the tape exerts lateral forces on the first-mentioned means, comprising: a cam rigidly secured to said shaft, a spring-biased cam follower member mounted to exert pressure against said cam, and a series pair of springs for providing said bias, one of said springs being relatively strong and the other being relatively weak, said springs and cam follower being so arranged that swinging movement of the arm to shorten the path of the tape between points of origin and destination rotates the cam to displace the follower, whereby the follower is cammed against the force of the weaker spring before being cammed against the force of the stronger spring.

3. A tape tension and take-up device for a tape recorder, comprising, in combination, a guide pulley for positioning a magnetic tape in tension between points of origin and destination, a base member having an aperture formed therein, crank means having a shaft projecting through said aperture and an arm positioned to swing in a plane parallel to the base member, said guide pulley being rotatably mounted on the end of said arm, and means for displacing said arm so that the pulley follows the tape, comprising: a cam rigidly secured to said shaft, a spring-biased plunger member mounted to exert pressure against said cam, and a series pair of springs for providing said pressure, one of said springs being relatively strong and the other being preloaded and relatively weak, said springs and plunger and cam being so arranged that swinging movement of the arm to lengthen the path of the tape between points of origin and destination tends to be caused by the action of the plunger against the cam.

4. A tape tension and take-up device for a tape recorder, comprising, in combination, a guide pulley for positioning a magnetic tape in tension between points of origin and destination, crank means having a rotatable shaft and a swingable arm, said guide pulley being rotatably mounted on the end of said arm, and means for yieldably controlling displacement of said arm so that the pulley follows the tape, comprising: a cam rigidly secured to said shaft, and a spring-biased plunger member mounted to exert pressure against said cam.

5. A tape tension and take-up device in accordance with claim 4 and circuit-closure means including a contact mounted on said cam for closing an electric circuit when tape-breakage permits the plunger to turn the cam without opposition from the tape.

6. A tape tension and take-up device in accordance with claim 5, and a counterweight mounted on said shaft to aid said turn of the cam.

References Cited in the file of this patent

UNITED STATES PATENTS

| | | |
|---|---|---|
| 1,319,961 | Lowe et al. | Oct. 28, 1919 |
| 1,400,827 | Leumann | Dec. 20, 1921 |
| 1,984,749 | Lamatsch | Dec. 18, 1934 |
| 2,318,316 | Lawrence | May 4, 1943 |